United States Patent
Suzuki et al.

(10) Patent No.: US 12,478,284 B2
(45) Date of Patent: Nov. 25, 2025

(54) RADIOGRAPHY APPARATUS PROVIDED WITH CAMERA AND IMAGE PROCESSING METHOD

(71) Applicant: FUJIFILM Healthcare Corporation, Kashiwa (JP)

(72) Inventors: Koichiro Suzuki, Chiba (JP); Tadashi Nakamura, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 221 days.

(21) Appl. No.: 18/398,590

(22) Filed: Dec. 28, 2023

(65) Prior Publication Data

US 2024/0237920 A1 Jul. 18, 2024

(30) Foreign Application Priority Data

Jan. 18, 2023 (JP) .................................. 2023-006065

(51) Int. Cl.
*A61B 5/11* (2006.01)
*G06T 7/246* (2017.01)

(52) U.S. Cl.
CPC ............ *A61B 5/1106* (2013.01); *G06T 7/246* (2017.01); *G06T 2207/30196* (2013.01)

(58) Field of Classification Search
CPC ..... A61B 6/4405; A61B 6/4452; A61B 6/547; A61B 5/0077; A61B 5/11; A61B 5/1114; A61B 5/1128; A61B 6/5264; A61B 6/527; A61B 8/5276
See application file for complete search history.

(56) References Cited

U.S. PATENT DOCUMENTS

2020/0077971 A1* 3/2020 Kuwata ................ A61B 6/4405

FOREIGN PATENT DOCUMENTS

JP 2004-208954 A 7/2004

* cited by examiner

*Primary Examiner* — Don K Wong
(74) *Attorney, Agent, or Firm* — Paul Teng

(57) ABSTRACT

A radiography apparatus is provided in which a doctor can recognize wear-off of anesthesia without interrupting an operation of an endoscope or the like. With the radiography apparatus, images of a plurality of parts of a subject are extracted from an image captured by a camera to calculate a movement amount for each part. The calculated movement amount for each part is weighted with a weight that is determined in advance for each of the plurality of parts, and in a case in which the movement amount after the weighting exceeds a predetermined threshold value, an operator is notified that the movement amount after the weighting exceeds the predetermined threshold value.

10 Claims, 9 Drawing Sheets

RADIOGRAPHY APPARATUS PROVIDED WITH CAMERA AND IMAGE PROCESSING METHOD

CROSS-REFERENCE TO RELATED APPLICATION

The present application claims priority from Japanese patent application 2023-006065 filed on Jan. 18, 2023, the content of which is hereby incorporated by reference into this application.

BACKGROUND OF INVENTION

1. Field of the Invention

The present invention relates to a radiography apparatus that acquires an image by irradiating a subject with radiation.

2. Description of the Related Art

Interventional radiology (IVR) is known in which an endoscope or a catheter is inserted into a patient while acquiring a fluoroscopic image by irradiating the patient with radiation from a radiography apparatus, to perform various procedures on the patient. In the IVR, in a case in which a doctor checks a condition of the patient, the doctor temporarily stops an operation of the catheter or the endoscope, and visually checks a face, a foot, or a hand of the patient. In general, a monitor for displaying an image captured by the endoscope and a monitor for displaying the fluoroscopic image are disposed in front of the doctor, and the subject is disposed next to the doctor. Therefore, in order to check the condition of the patient, it is necessary to move a visual line from the monitor to the patient.

JP2004-208954A discloses a system for a doctor or a technician who operates an X-ray CT apparatus, which is disposed in a gantry room, in a console room next to an imaging room while imaging a state of a patient via the X-ray CT apparatus, to check the state of the patient. In this system, the patient is imaged by a camera installed in or near the X-ray CT apparatus, and the captured image is displayed on a part of an operation screen of the console room. Specifically, there is disclosed an aspect in which a plurality of parts of the patient are imaged by using a plurality of cameras, a plurality of display regions are provided on the operation screen, and a plurality of images are displayed, or an aspect in which one image is displayed (see FIGS. 3A and 3B of JP2004-208954A). It also discloses that an edge of an image of the patient in the image is detected, the presence or absence of body movement is detected from a change in a width direction or a thickness direction, and the image is displayed together with the presence or absence of body movement. Accordingly, the operator can check the state of the patient from the image displayed on a part of the operation screen during the operation on an operation console, and can also know the presence or absence of body movement.

SUMMARY OF INVENTION

One of the purposes for the doctor to visually recognize the state of the patient during the IVR is to check whether or not the anesthesia is about to wear off, but in order for the doctor to directly visually recognize the state of the patient, it is necessary to temporarily stop the operation of the endoscope or the like and to move the visual line from the monitor to patient.

In addition, in the technique of JP2004-208954A, since the images of a plurality of parts of the patient imaged by the plurality of cameras are displayed on the operation screen of the operation console, a region in which the image captured by the endoscope is displayed and a region in which the fluoroscopic image is displayed on the operation screen are reduced. On the other hand, in a case in which the part of the patient to be displayed is limited to one, it is difficult for the doctor to determine whether or not the anesthesia is about to wear off only at that part.

An object of the present invention is to provide a radiography apparatus in which a doctor can recognize wear-off of anesthesia without interrupting an operation of an endoscope or the like.

In order to achieve the object described above, an aspect of the present invention provides a radiography apparatus including a top plate on which a subject is placed, a radiation source that irradiates the subject with radiation, a radiation detector that detects the radiation applied from the radiation source and is transmitted through the subject, a camera that images the subject, and a movement amount calculation unit that processes an image captured by the camera to calculate a movement amount of the subject. The movement amount calculation unit extracts images of a plurality of predetermined parts of the subject from the image captured by the camera to calculate a movement amount for each part. The movement amount calculation unit weights the calculated movement amount for each part with a weight that is determined in advance for each of the plurality of parts, and notifies, in a case in which the movement amount after the weighting exceeds a predetermined threshold value, an operator that the movement amount after the weighting exceeds the predetermined threshold value.

According to the aspect of the present invention, it is possible to provide the radiography apparatus in which the doctor can recognize the wear-off of anesthesia without interrupting the operation of the endoscope or the like.

DESCRIPTION OF PREFERRED EMBODIMENTS

Hereinafter, a radiography apparatus according to an embodiment of the present invention will be described with reference to the accompanying drawings.

First Embodiment

Figure 1:
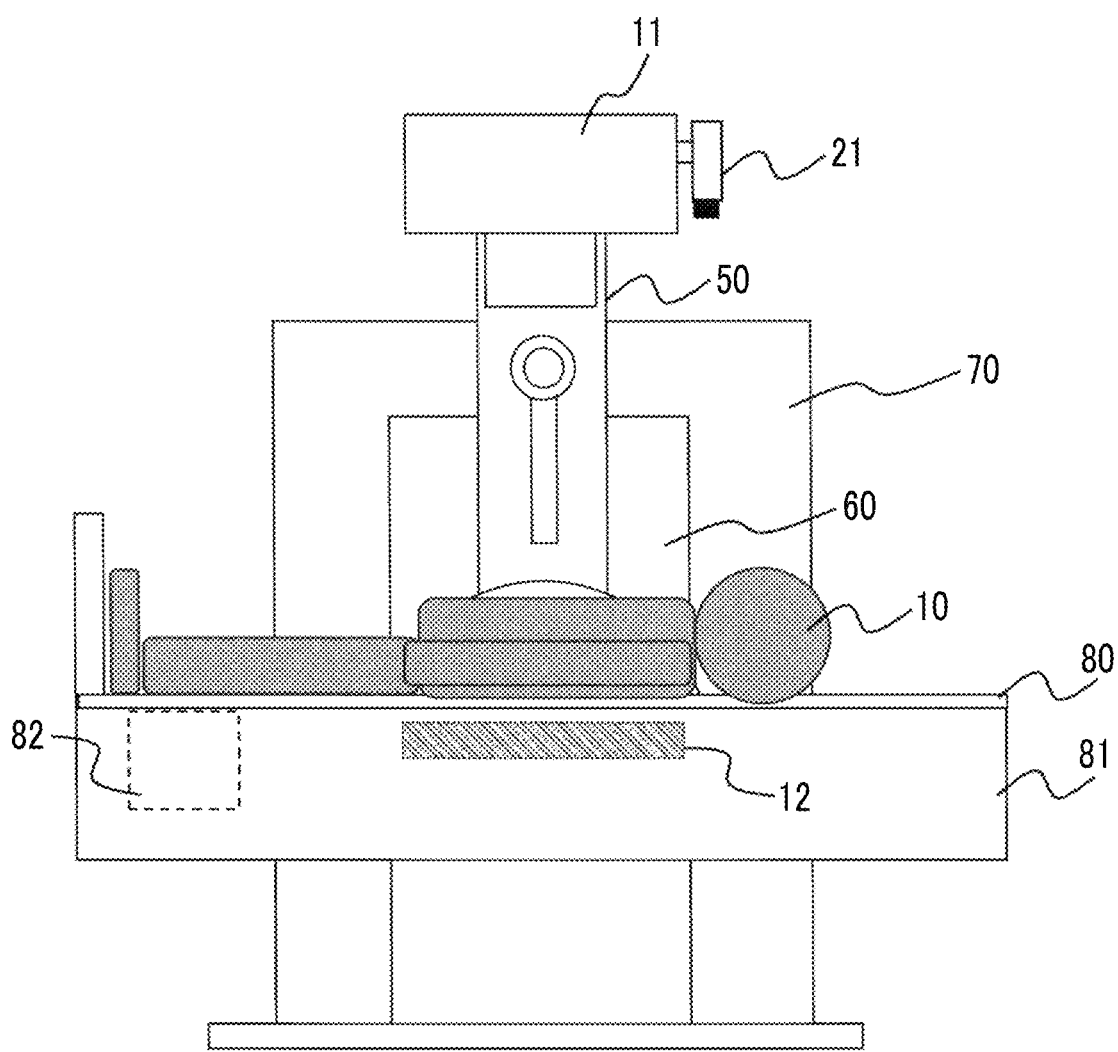
FIG. 1 is a front view of a radiography apparatus 1 according to a first embodiment of the present invention.
Figure 2:
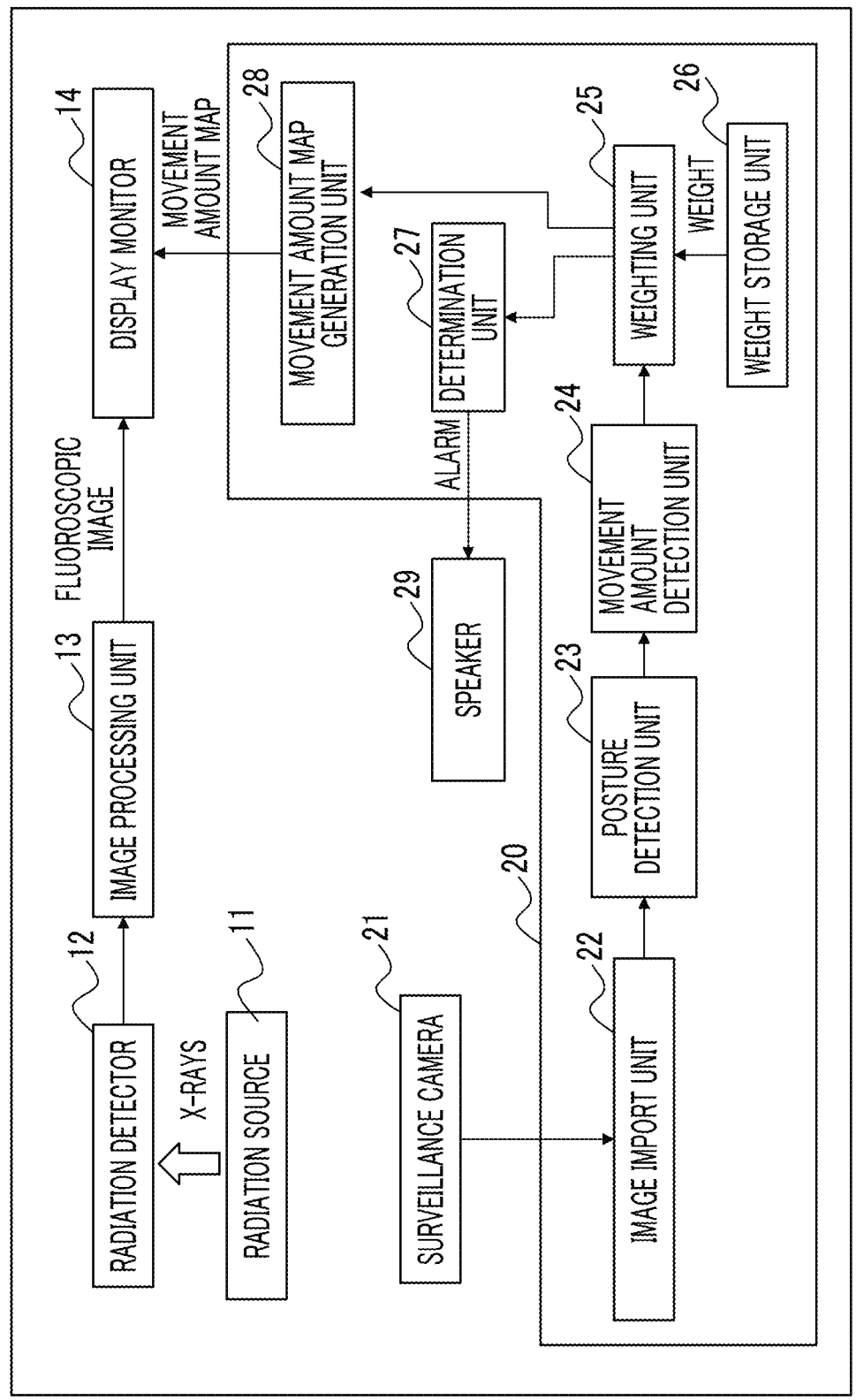
FIG. 2 is a functional block diagram of the radiography apparatus 1 according to the first embodiment.
Figure 3:
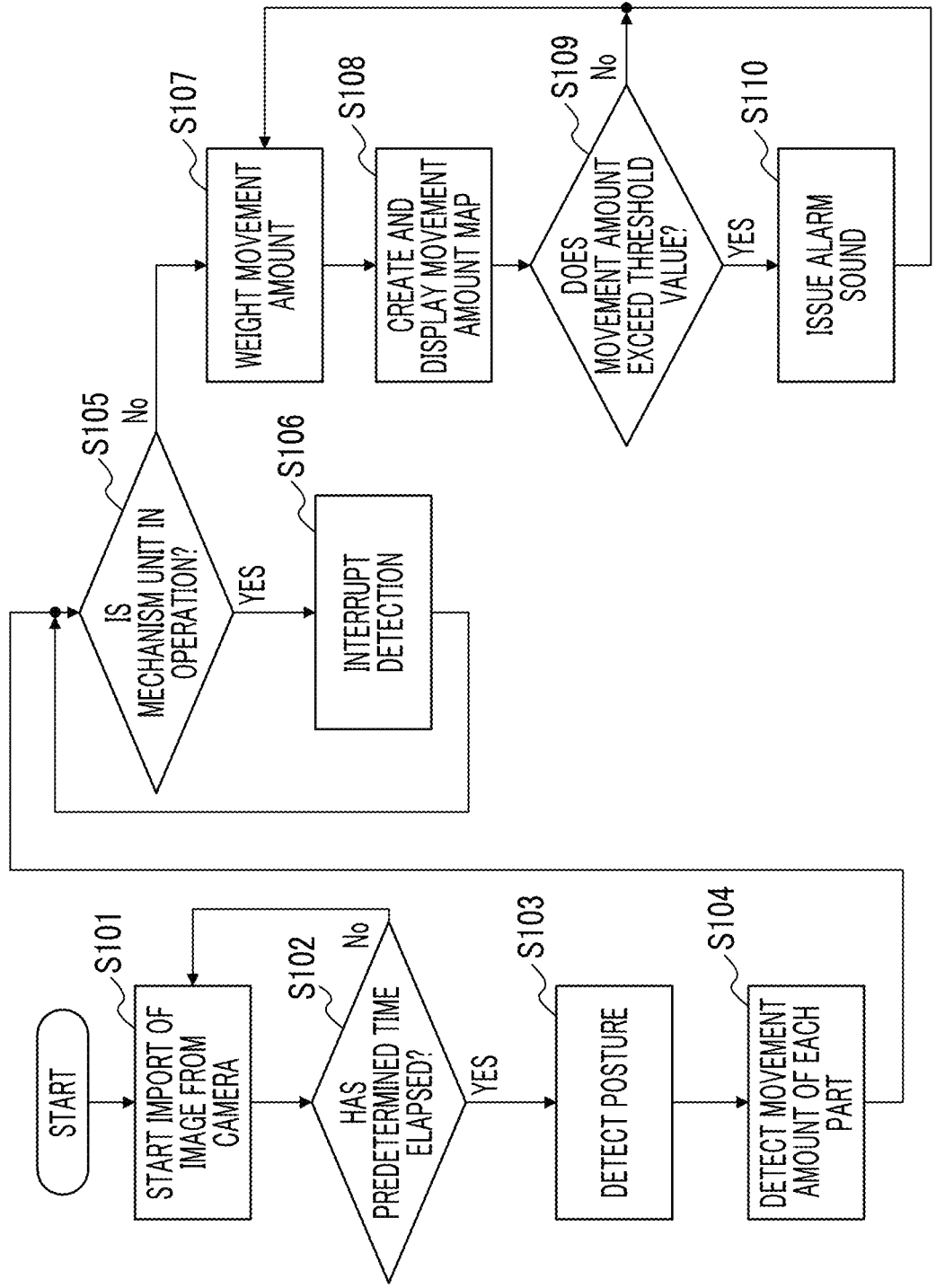
FIG. 3 is a flowchart showing an operation of the radiography apparatus 1 according to the first embodiment.

A radiography apparatus 1 according to the first embodiment will be described with reference to FIGS. 1 to 3. FIG. 1 is a front view of the radiography apparatus 1, FIG. 2 is a functional block diagram of the radiography apparatus 1, and FIG. 3 is a flowchart showing an operation of the radiography apparatus 1.

As shown in FIG. 1, the radiography apparatus 1 comprises a top plate 80 on which a subject 10 is placed, and a radiation source 11 that irradiates the subject 10 with X-rays. The radiation source 11 is supported with respect to a stand 70 by a radiation source support portion 50. In addition, a radiation source mechanism unit 60 that moves the radiation source support portion 50 up and down is provided on the stand 70.

On the other hand, the top plate 80 is supported with respect to the stand 70 by a top plate support portion 81. A mechanism unit 82 that moves a position of the top plate 80 in a longitudinal direction of the top plate 80 is built in the top plate support portion 81.

A radiation detector 12 is disposed in the top plate support portion 81. The radiation detector 12 has radiation detection elements disposed in two dimensions, and detects the X-rays that are applied from the radiation source 11 and are transmitted through the subject 10.

Figure 4:
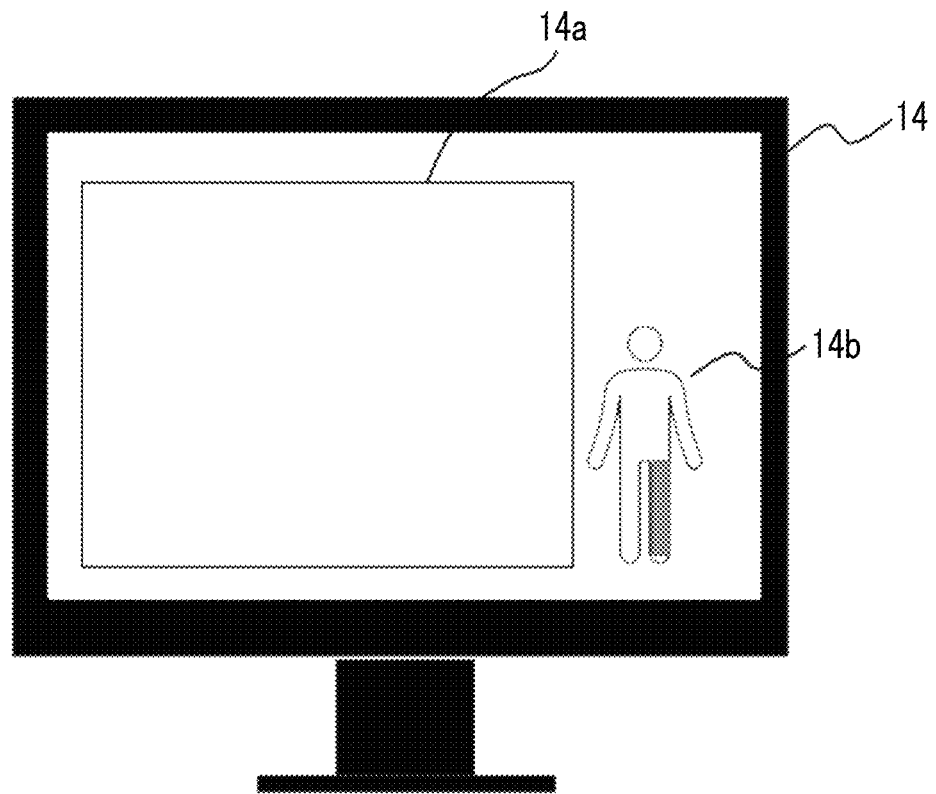
FIG. 4 is a diagram showing an image example of a display monitor of the radiography apparatus 1 according to the first embodiment.

A surveillance camera 21 that images the subject 10 is supported by the radiation source support portion 50. As shown in FIG. 4, the surveillance camera 21 is set to have an angle of view such that an entire body of the subject 10 on the top plate 80 is imaged. The surveillance camera 21 may be fixed to a cover (housing) of the radiation source 11.

As shown in FIG. 2, an image processing unit 13 is connected to the radiation detector 12, and receives a signal output by each radiation detection element of the radiation detector 12 by detecting the X-rays, to generate an X-ray image (here, a fluoroscopic image) at a predetermined frame rate. A display monitor 14 is connected to the image processing unit 13.

Figure 5:
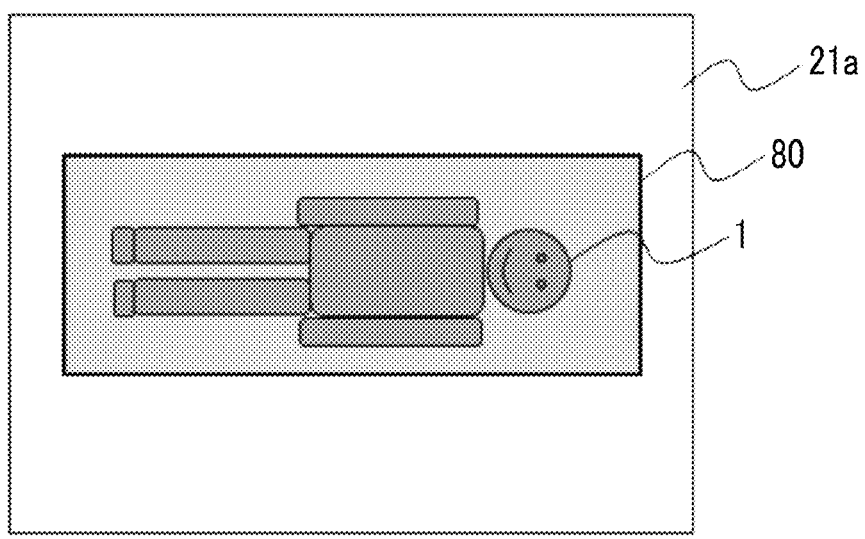
FIG. 5 is a diagram showing an example of a display screen of the radiography apparatus 1 according to the first embodiment.

FIG. 5 shows an example of a display screen of the display monitor 14. The fluoroscopic image is displayed in a region 14a of the display screen.

On the other hand, a movement amount calculation unit 20 is connected to the surveillance camera 21. The movement amount calculation unit 20 processes the image captured by the surveillance camera 21 to calculate a movement amount of the subject 10.

The movement amount calculation unit 20 includes an image import unit 22, a posture detection unit 23, a movement amount detection unit 24, a weight storage unit 26, a weighting unit 25, a determination unit 27, and a movement amount map generation unit 28.

The image import unit 22 imports images 21a output by the surveillance camera 21 at a predetermined time interval. The predetermined time interval can be set to be approximately the same as the frame rate of the fluoroscopic image generated by the image processing unit 13.

The posture detection unit 23 extracts a plurality of predetermined feature points (head, spine, right shoulder, right elbow, right wrist, left shoulder, left elbow, left wrist, right waist, right knee, right ankle, left waist, left knee, left ankle, or the like), such as a joint, of an image of the subject 10 in the image 21a, and detects two-dimensional coordinates thereof to detect a posture of the subject 10. The posture detection unit 23 can be realized by a known posture detection algorithm. For example, a posture estimation algorithm Open Pose (registered trademark) included in Open VINO (registered trademark) provided by Intel Corporation can be used.

The movement amount detection unit 24 calculates each movement amount for the plurality of predetermined parts (head, trunk, right arm, left arm, right foot, and left foot) of the subject 10 from the coordinates of the feature points of the subject 10 detected by the posture detection unit 23. For example, a difference in the coordinates the plurality of feature points (head, spine, right shoulder, right elbow, right wrist, left shoulder, left elbow, left wrist, right waist, right knee, right ankle, left waist, left knee, left ankle, or the like) between the image 21a imported by the image import unit 22 at the current time and the image 21a imported at the previous time can be calculated to use the calculated difference as the movement amount of each part. For example, a difference in the coordinates of the head between the images 21a of the previous time and the current time is used as the movement amount of the head. A difference in the coordinates of the spine between the images 21a of the previous time and the current time is used as the movement amount of the trunk. The maximum value of the difference in the coordinates of each of the right shoulder, the right elbow, and the right wrist between the images 21a of the previous time and the current time is used as the movement amount of the right arm, the maximum value of the difference in the coordinates of each of the left shoulder, the left elbow, and the left wrist is used as the movement amount of the left arm. In addition, the maximum value of the difference in the coordinates of each of the right waist, the right knee, and the right ankle between the images 21a of the previous time and the current time is used as the movement amount of the right foot, and the maximum value of the difference in the coordinates of each of the left waist, the left knee, and the left ankle is used as the movement amount of the left foot.

The weighting unit 25 weights the movement amount of each part (head, trunk, right arm, left arm, right foot, left foot) detected by the movement amount detection unit 24 with a weight stored for each part in advance in the weight storage unit 26. The weights for the parts stored in the weight storage unit 26 have a relationship of a weight value of the movement amount of the foot>a weight value of the movement amount of the head≥a weight value of the movement amount of the trunk≥a weight value of the movement amount of the arm. As an example, it is determined that the weight values of the movement of the right foot and the left foot=1.2, the weight value of the movement of the head=0.8, the weight value of the movement of the trunk =0.8, and the weight values of the movement of the right arm and the left arm=0.8.

In this way, the reason why the weight of the foot is set to be larger than the weights of the other parts is that the movement amount in a case in which the anesthesia is about to wear off is larger as the part is closer to the terminal of the body. Therefore, it is possible to easily determine whether or not the anesthesia is about to wear off by increasing the weight of the terminal part (arm or foot). On the other hand, in the image 21a in an intraoperative period, an image of the arm or the trunk of the subject 10 often overlaps with an image of a doctor, and the posture detection unit 23 cannot accurately detect the feature point of the arm or the trunk.

Therefore, although the arm is the terminal part, the weight value of the movement amount of the arm is reduced to be as small as the weight value of the movement amount of the trunk. As a result, the weight value of the movement amount of the foot is set to be larger than the weight values of the other parts, and it is determined whether or not the anesthesia wears off with an emphasis on the movement amount of the foot.

It should be noted that the weighting unit 25 can also use the weight stored in the weight storage unit 26 by correcting the weight in accordance with at least one of a height of the subject 10 currently placed on the top plate 80 or a predetermined indicator indicating a size of the body of the subject 10. For example, in a case of a child having a small body, the weight value of the movement amount of the head may be corrected to be as large as the weight value of the movement amount of the foot. In this case, the height of the subject 10 is detected from the image 21a captured by the surveillance camera 21, and in a case in which the height is smaller than the predetermined threshold value (for example, 130 cm), it is determined that the subject is the child, and the weight value of the movement amount of the head can be corrected to be large. In addition, it is also possible to determine that the subject is the child in a case in which a surface area of the subject 10 of the image 21a is smaller than the predetermined threshold value as well as the height. In addition, in a case of the subject 10 of which the height or the surface area of the body is significantly larger than a value of an ordinary adult as well as the child, for example, the correction may be performed, such as reducing the weight value of the foot as small as the weight value of the arm.

In a case in which one or more of the movement amounts for the parts after the weighting exceed the predetermined threshold value, the determination unit 27 notifies an operator that the one or more of the movement amounts for the parts after the weighting exceed the predetermined threshold value. For example, the determination unit 27 issues an alarm sound from a connected speaker 29 to notify the alert to the wear-off of anesthesia. It should be noted that the notification method is not limited to the alarm sound, and of course, another method, such as displaying a warning on the display monitor 14, can also be used.

The movement amount map generation unit 28 selects a color determined in advance corresponding to the movement amount for each part after the weighting calculated by the weighting unit 25, and adds the color to a map representing a shape of the subject 10 for each part. As a result, the map in which the movement amount of each part is represented by the color is generated. The color to be selected is a color having a different hue or lightness, which is determined in advance in accordance with the movement amount.

As shown in FIG. 4, the movement amount map generation unit 28 displays the generated map in a predetermined region 14b of the display monitor 14. Accordingly, the operator can understand the movement amount of each part by the color of the map while looking at the display monitor 14 on which the fluoroscopic image is displayed, and it is not necessary to move the visual line.

Hereinafter, an operation of each unit of the movement amount calculation unit 20 will be described with reference to a flow of FIG. 3.

Step S101

After the doctor starts the insertion of an endoscope or a catheter into the subject 10, the image import unit 22 starts an operation of importing the images from the surveillance camera 21 at the predetermined time interval. It should be noted that the fact that the doctor starts the insertion of the endoscope or the catheter into the subject 10 may be determined by the image import unit 22 processing the imported image from the movement of the doctor. Alternatively, in a case in which the image import unit 22 detects that the X-ray emission from the radiation source 11 is started, it may be determined that the insertion of the endoscope or the like is started.

Step S102

The image import unit 22 waits until a predetermined time elapses from the start of image import in step S101, and proceeds to step S103 after the predetermined time has elapsed. Here, the reason why the image import unit 22 waits until the predetermined time elapses is that, since a time immediately after the start of the insertion of the endoscope or the like is a time immediately after the administration of anesthesia, it is not necessary to determine whether or not the anesthesia wears off.

Step S103

After the predetermined time has elapsed, the image import unit 22 outputs the imported image 21a to the posture detection unit 23. The posture detection unit 23 extracts the plurality of feature points (head, spine, right shoulder, right elbow, right wrist, left shoulder, left elbow, left wrist, right waist, right knee, right ankle, left waist, left knee, left ankle, or the like) of the image of the subject 10 in the image 21a, and detects the two-dimensional coordinates thereof.

Step S104

The movement amount detection unit 24 detects each movement amount for the plurality of predetermined parts (head, trunk, right arm, left arm, right foot, and left foot) of the subject 10 from the coordinates of the feature points of the subject 10 detected by the posture detection unit 23.

Steps S105 and S106

Here, the movement amount detection unit 24 detects whether or not the mechanism unit 82 of the top plate 80 is in operation, and in a case in which the mechanism unit 82 is in operation, the movement amount detection unit 24 interrupts the detection of the movement amount and waits until the mechanism unit 82 stops.

Step S107

The weighting unit 25 weights the movement amount of each part (head, trunk, right arm, left arm, right foot, left foot) detected by the movement amount detection unit 24 in step S104 with the weight stored for each part in advance in the weight storage unit 26.

In this case, the weighting unit 25 may detect the height or the like of the subject 10 to perform the weighting after correcting the weight of the weight storage unit 26 in accordance with the detection result.

Step S108

The movement amount map generation unit 28 generates the map in which the movement amount of each part weighted in step S107 is represented by the color.

Step S109

The determination unit 27 determines whether or not the movement amount of each part after the weighting exceeds the predetermined threshold value. In a case in which one or more of the movement amounts of the parts after the weighting exceeds the threshold value, the process proceeds to step S110.

Step S110

The determination unit 27 issues the alarm sound from the connected speaker 29. As a result, the operator is notified of the possibility that the anesthesia wears off.

The steps S103 to S110 are repeatedly performed each time the image import unit 22 imports the image at the predetermined rate.

As described above, by using the radiography apparatus according to the first embodiment, the doctor can recognize the wear-off of anesthesia from the alarm sound or the display screen without interrupting the operation of the endoscope or the like.

In addition, the radiography apparatus according to the first embodiment can sense the movement amount of the subject 10 only in a time slot in which a predetermined time elapses from the start and there is a risk of wear-off of anesthesia, not in the entire process of the IVR, calculate the movement amount, and display the map. In addition, the alarm sound can be issued in a case in which the movement amount exceeds the threshold value. Therefore, the movement detection specialized for the wear-off of anesthesia is possible.

In addition, the doctor can understand the movement amount of the patient without moving the visual line from the display monitor on which the fluoroscopic image is displayed.

In addition, since the movement amount of the image 21a captured by the surveillance camera 21 is weighted with the weight in accordance with the part, the weight for the movement amount of the terminal part of the subject 10, particularly the foot can be increased, and it is determined whether or not the anesthesia is about to wear off by also using the movement amounts of the other parts as determination materials, and the determination result can be shown to the doctor. In the image of the surveillance camera 21, the foot is less likely to overlap with the image of the doctor, and has the detection accuracy that is less likely to decrease as compared with the arm, so that it is possible to accurately determine the wear-off of anesthesia.

Second Embodiment

Figure 6:
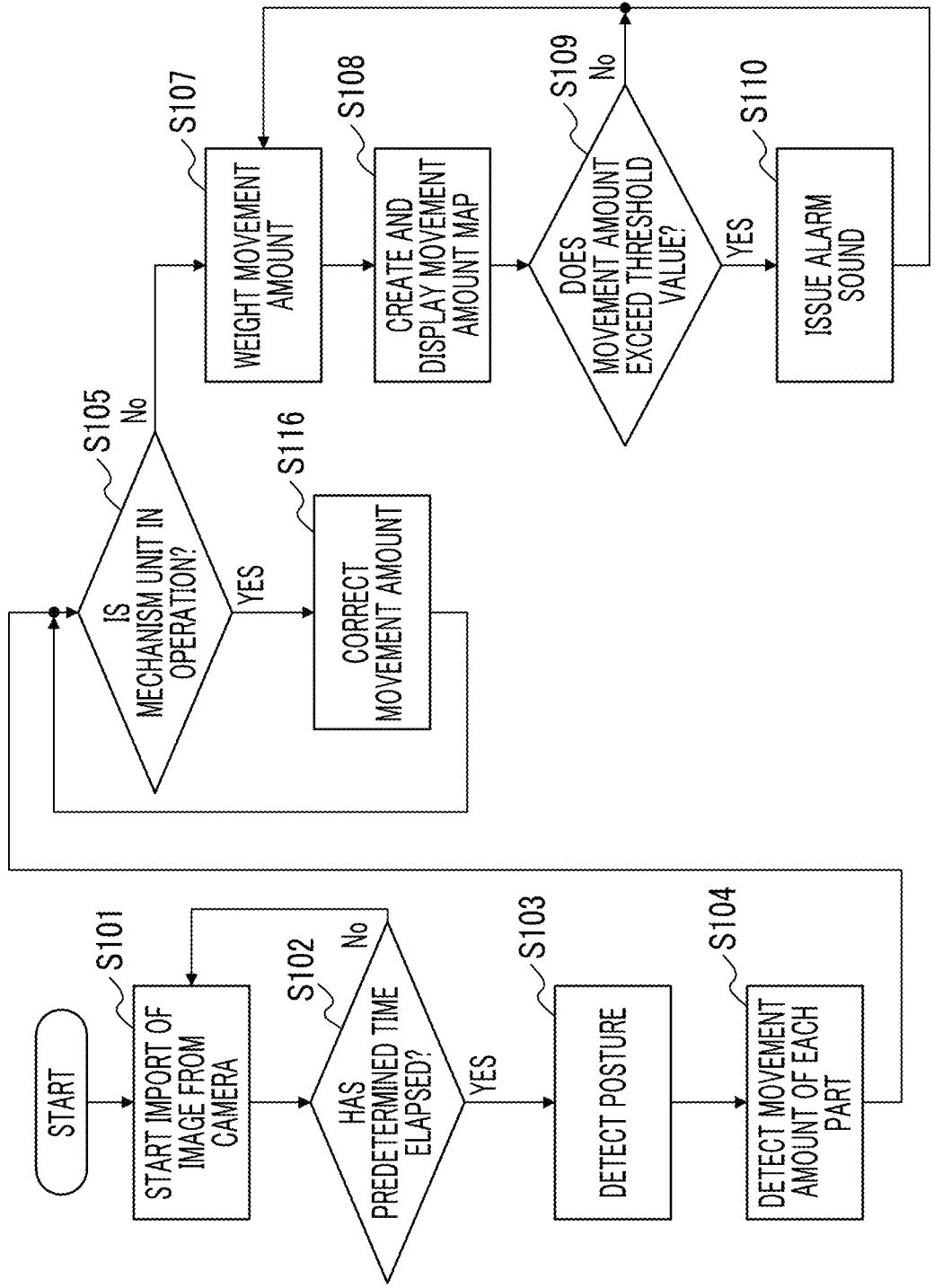
FIG. 6 is a flowchart showing an operation of a radiography apparatus according to a second embodiment.

A radiography apparatus according to a second embodiment will be described with reference to a flow of FIG. 6.

A configuration of the radiography apparatus according to the second embodiment is the same as the configuration of the radiography apparatus according to the first embodiment, but a part of the operations is different. Hereinafter, only the different parts will be described with reference to the flow of FIG. 6.

In the first embodiment, as in steps S105 and S106 of the flow of FIG. 3, the configuration is adopted in which the movement amount detection unit 24 detects whether or not the mechanism unit 82 of the top plate 80 is in operation, and in a case in which the mechanism unit 82 is in operation, the movement amount detection unit 24 interrupts the detection of the movement amount and waits until the mechanism unit 82 stops.

In the second embodiment, in step S105, the movement amount detection unit 24 detects whether or not the mechanism unit 82 of the top plate 80 is in operation, and in a case in which the mechanism unit 82 is in operation, the process proceeds to step S116.

In step S116, the movement amount detection unit 24 further detects a direction in which the mechanism unit 82 moves the top plate 80 and a moving amount thereof, and performs the correction by subtracting the movement amount of each part (head, trunk, right arm, left arm, right foot, or left foot) of the subject 10 caused by the movement of the top plate 80 from the movement amount detected in step S104.

In step S107, the weighting unit 25 weights the movement amount of each part corrected by the movement amount detection unit 24 in step S116 with the weight stored for each part in advance in the weight storage unit 26.

Since the other steps are the same as the steps in the first embodiment, the description thereof will be omitted.

As described above, the radiography apparatus according to the second embodiment can removes the movement amount of the subject 10 caused by the movement of the top plate 80 by the correction, to create and display a movement amount map by using the corrected movement amount without interrupting the detection of the movement amount even while the top plate 80 is moved. In addition, in a case in which the corrected movement amount exceeds the threshold value, the doctor can be notified of the possibility of the wear-off of anesthesia by the alarm sound.

Therefore, even in a medical operation in which the top plate is frequently moved, the movement amount of each part can be calculated and displayed without interruption. In addition, notification of the possibility of the wear-off of anesthesia can be performed.

Third Embodiment

Figure 7:
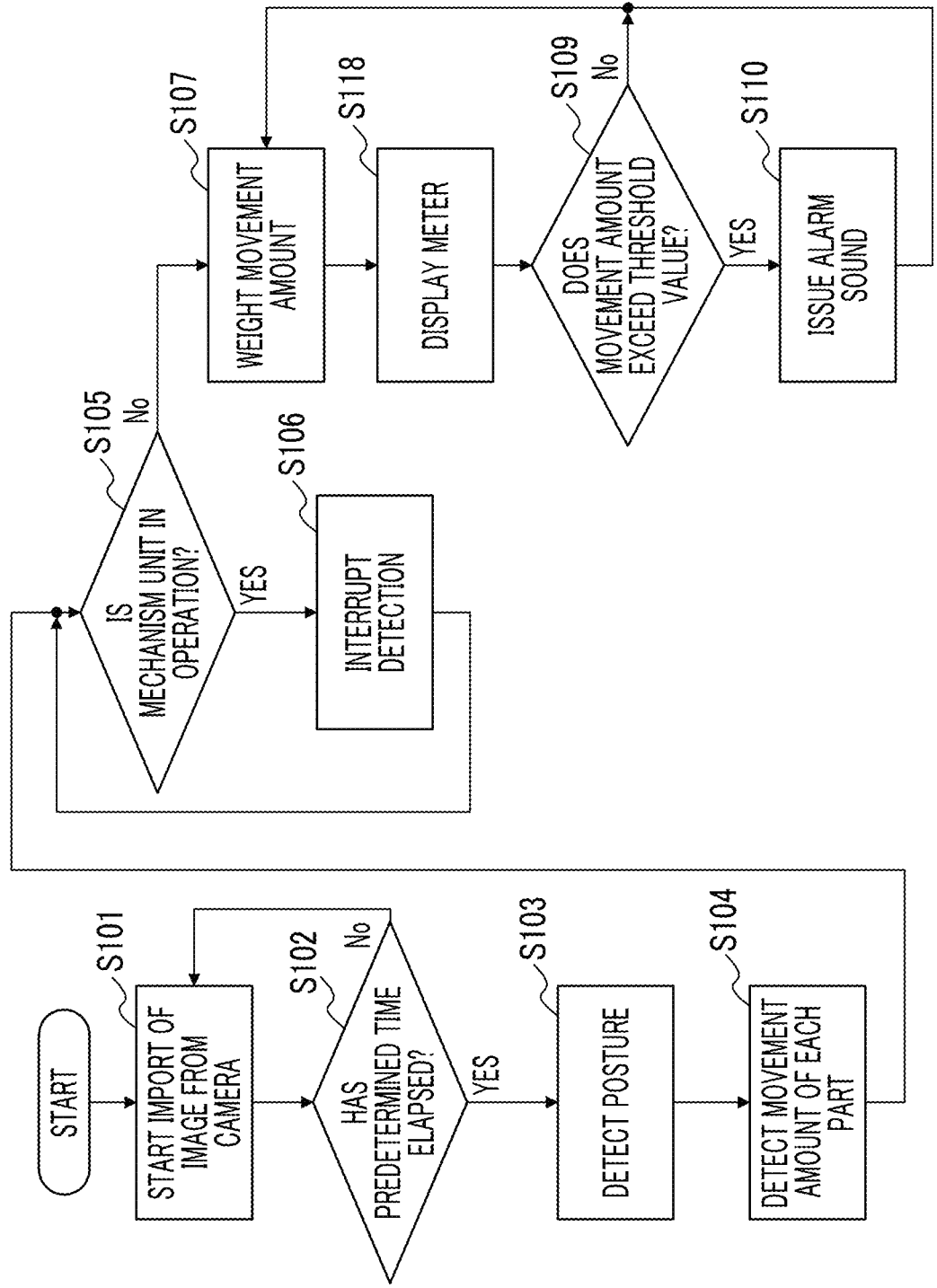
FIG. 7 is a flowchart showing an operation of a radiography apparatus according to a third embodiment.

A radiography apparatus according to a third embodiment will be described with reference to a flow of FIG. 7 and a display screen example of FIG. 8.

A configuration of the radiography apparatus according to the third embodiment is the same as the configuration of the radiography apparatus according to the first embodiment, but the method of displaying the movement amount on the display monitor 14 is different. Hereinafter, only the different parts will be described with reference to FIGS. 7 and 8.

In the first embodiment, the configuration is adopted in which the map in which the movement amount of each part is represented by the color is generated in step S108 of FIG. 3 and displayed in the region 14b of the display monitor 14. However, in the third embodiment, in step S118 instead of step S108, an image of a measurer (meter) in which the movement amount after the weighting is represented is displayed in the region 14b of the display monitor 14 as in FIG. 8.

Figure 8:
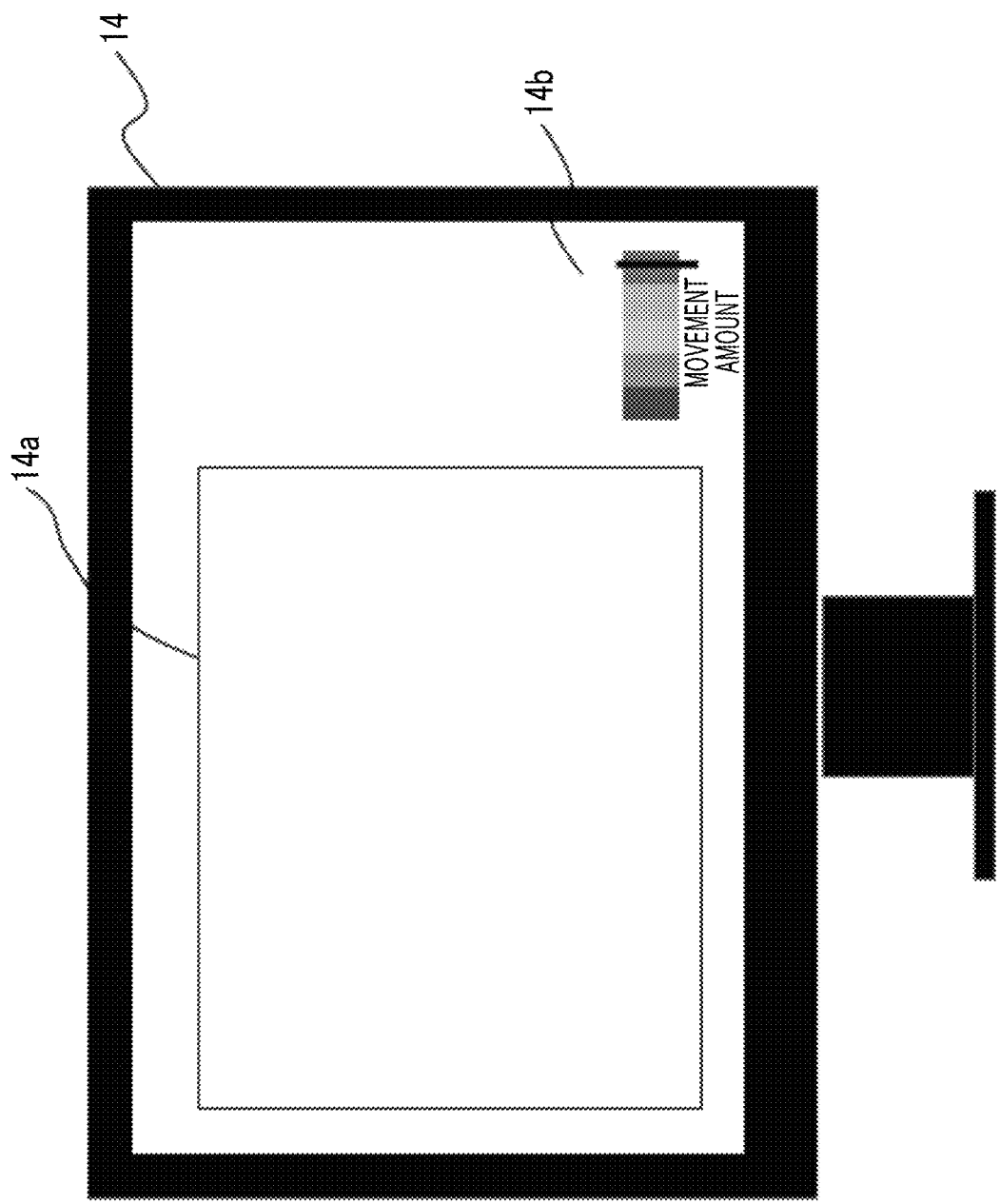
FIG. 8 is a diagram showing an image example of a display monitor of the radiography apparatus according to the third embodiment.

In the example of FIG. 8, as the image of the meter, an image is shown in which a horizontally long bar indicating the value of the movement amount is displayed with a vertical line indicating the movement amount after the weighting calculated in step S107, but a meter having another shape may be used.

As shown in FIG. 8, only one meter may be displayed on the display monitor 14 to display the maximum value of the movement amount of each part, or the meter may be displayed for each part.

By representing the movement amount with the meter as in the third embodiment, there is an advantage that the doctor can easily understand the magnitude of the movement amount.

Fourth Embodiment

A radiography apparatus according to a fourth embodiment will be described with reference to a flow of FIG. 9 and a display screen example of FIG. 10.

A configuration of the radiography apparatus according to the fourth embodiment is the same as the configuration of the radiography apparatus according to the first embodiment, but the method of displaying the movement amount on the display monitor 14 is different.

Figure 9:
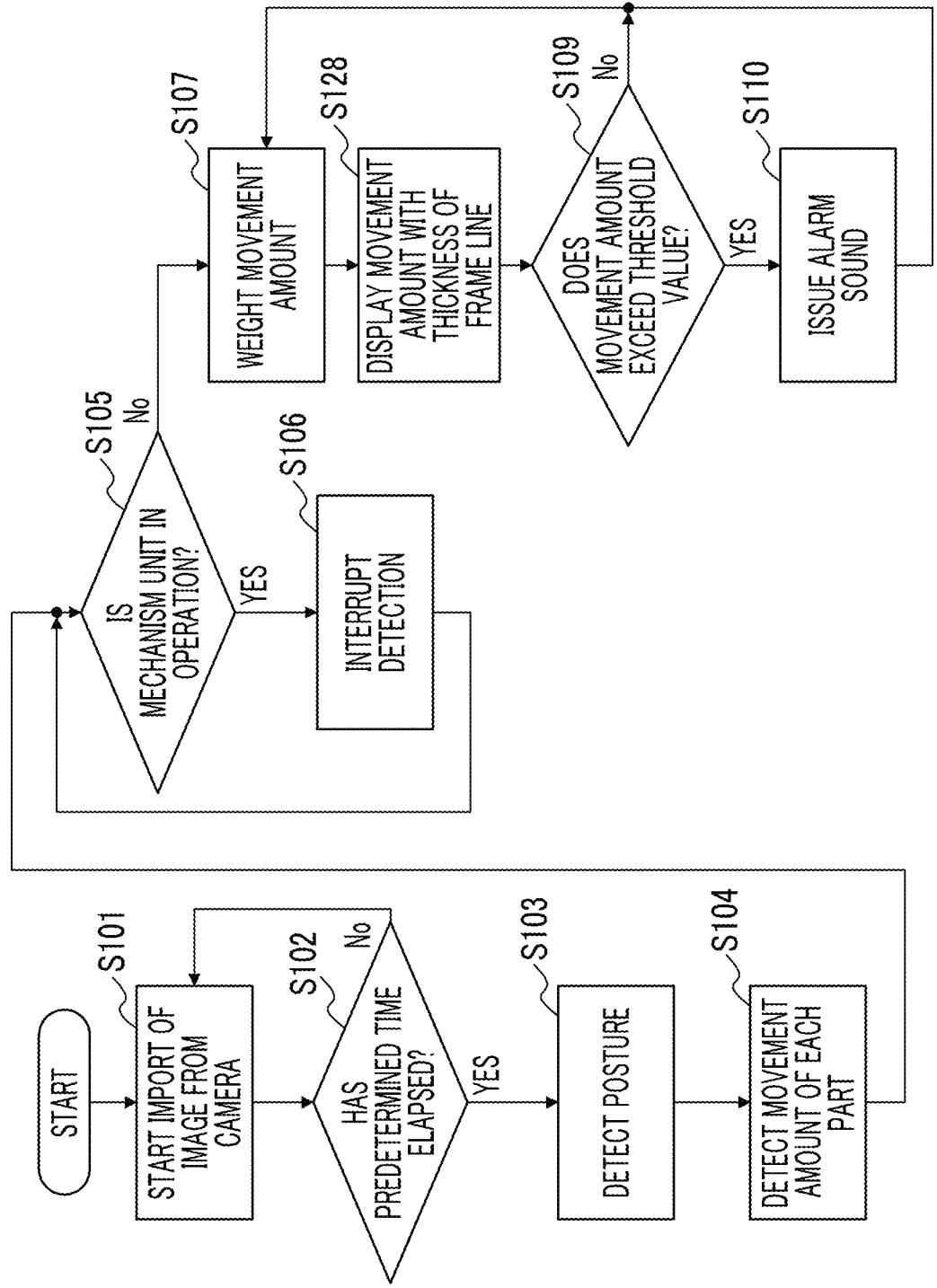
FIG. 9 is a flowchart showing an operation of a radiography apparatus according to a fourth embodiment.
Figure 10:
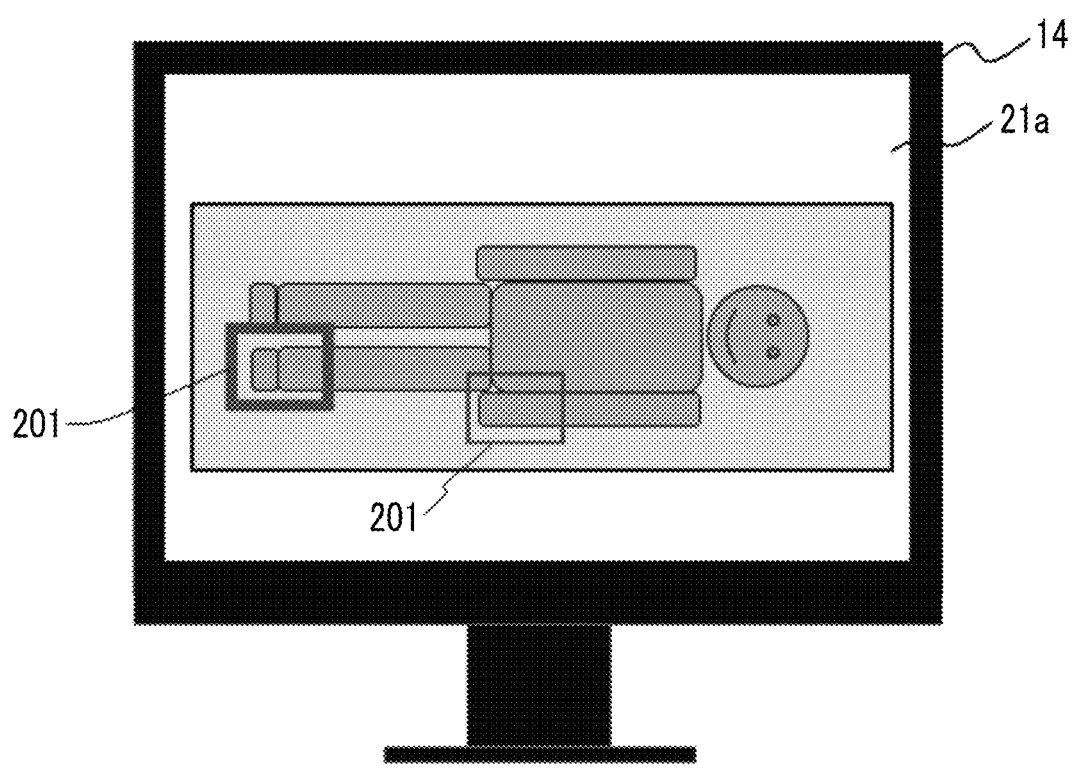
FIG. 10 is a diagram showing an image example of a display monitor of the radiography apparatus according to the fourth embodiment.

In the third embodiment, as in the flow of FIG. 9, step S128 is performed instead of the step S108 of the first embodiment, and the movement amount after the weighting is displayed as in FIG. 10 with thicknesses of frame lines 201a and 201b which indicate the parts of the subject 10 on the image 21a.

For example, in the example of FIG. 10, the movement amounts of the left arm and the left foot after the weighting are calculated in step S107, and since the movement amount of the left foot is larger than the movement amount of the left arm, on the image 21a, the thick frame line 201a is displayed at a position of the left foot and the frame line 201b thinner than the frame line of the left foot is displayed at a position of the left arm.

In addition, in the example of FIG. 10, since the image 21a is displayed independently, there is an advantage that the movement amount of the subject 10 can be easily understood by the large image 21a. It should be noted that, of course, it is also possible to display the image 21a on which the frame lines 201a and 201b are displayed, side by side with the fluoroscopic image.

Explanation of References

1: radiography apparatus
10: subject
11: radiation source
12: radiation detector
13: image processing unit
14: display monitor
14a: region
14b: region
20: movement amount calculation unit
21: surveillance camera
21a: image
22: image import unit
23: posture detection unit
24: movement amount detection unit
25: weighting unit
26: weight storage unit
27: determination unit
28: movement amount map generation unit
29: speaker
50: radiation source support portion
60: radiation source mechanism unit
70: stand
80: top plate
82: mechanism unit
201a: frame line
201b: frame line

What is claimed is:

1. A radiography apparatus provided with a camera, the radiography apparatus comprising:
a top plate on which a subject is placed;
a radiation source that irradiates the subject with radiation;
a radiation detector that detects the radiation applied from the radiation source and is transmitted through the subject;
a camera that images the subject; and
a movement amount calculation unit that processes an image captured by the camera to calculate a movement amount of the subject,
wherein the movement amount calculation unit extracts images of a plurality of predetermined parts of the subject from the image captured by the camera to calculate a movement amount for each part, weights the calculated movement amount for each part with a weight that is determined in advance for each of the plurality of parts, and notifies, in a case in which the movement amount after the weighting exceeds a predetermined threshold value, an operator that the movement amount after the weighting exceeds the predetermined threshold value.

2. The radiography apparatus provided with a camera according to claim 1,
wherein the movement amount calculation unit detects movement of parts of a head, a trunk, an arm, and a foot of the subject as the plurality of parts of the subject, and
the weights used for weighting have a relationship of a weight value of a movement amount of the foot>a weight value of a movement amount of the head≥a weight value of a movement amount of the trunk≥a weight value of a movement amount of the arm.

3. The radiography apparatus provided with a camera according to claim 1,
wherein the movement amount calculation unit corrects the weight in accordance with at least one of a height of the subject currently placed on the top plate or a predetermined indicator indicating a size of a body of the subject.

4. The radiography apparatus provided with a camera according to claim 1,
wherein the movement amount calculation unit calculates a height of the subject or an indicator indicating a size of a body of the subject by using the image of the subject captured by the camera.

5. The radiography apparatus provided with a camera according to claim 1,
wherein the movement amount calculation unit issues, for realizing the notification to the operator, an alarm sound from a connected speaker.

6. The radiography apparatus provided with a camera according to claim 1,
wherein the movement amount calculation unit displays, for realizing the notification to the operator, a map in which the movement amount of the part multiplied by the weight is represented by a color or an image of a measurer in which the movement amount multiplied by the weight is represented, on a display device.

7. The radiography apparatus provided with a camera according to claim 1, further comprising:
a mechanism unit that moves a position of the top plate,
wherein the movement amount calculation unit interrupts the calculation of the movement amount in a case in which it is detected that the mechanism unit is in operation.

8. The radiography apparatus provided with a camera according to claim 1, further comprising:
a mechanism unit that moves a position of the top plate,
wherein the movement amount calculation unit corrects the movement amount calculated for the part in accordance with a moving amount of the top plate in a case in which it is detected that the mechanism unit moves the top plate.

9. The radiography apparatus provided with a camera according to claim 1, further comprising:
a support portion that supports the radiation source,
wherein the camera is provided on the support portion.

10. An image processing method of a radiography apparatus provided with a camera, the image processing method comprising:
a step of extracting images of a plurality of predetermined parts of a subject from an image captured by the camera to calculate a movement amount for each of the plurality of parts;
a step of weighting the calculated movement amount for each part with a weight that is determined in advance for each of the plurality of parts; and
a step of notifying, in a case in which the movement amount after the weighting exceeds a predetermined threshold value, an operator that the movement amount after the weighting exceeds the predetermined threshold value.

* * * * *